United States Patent Office 3,107,070
Patented Oct. 15, 1963

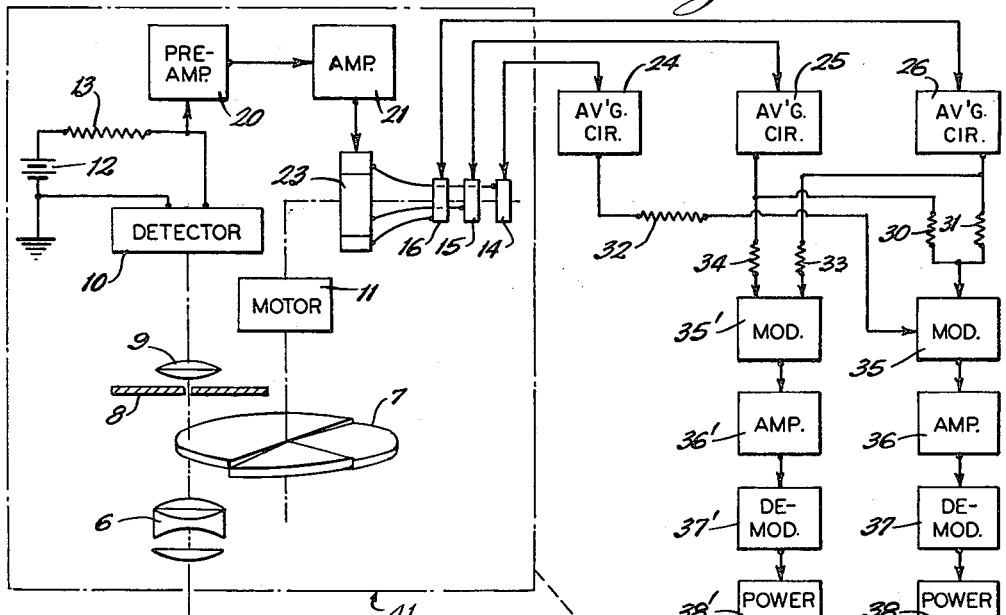
Fig. 1
Fig. 1A
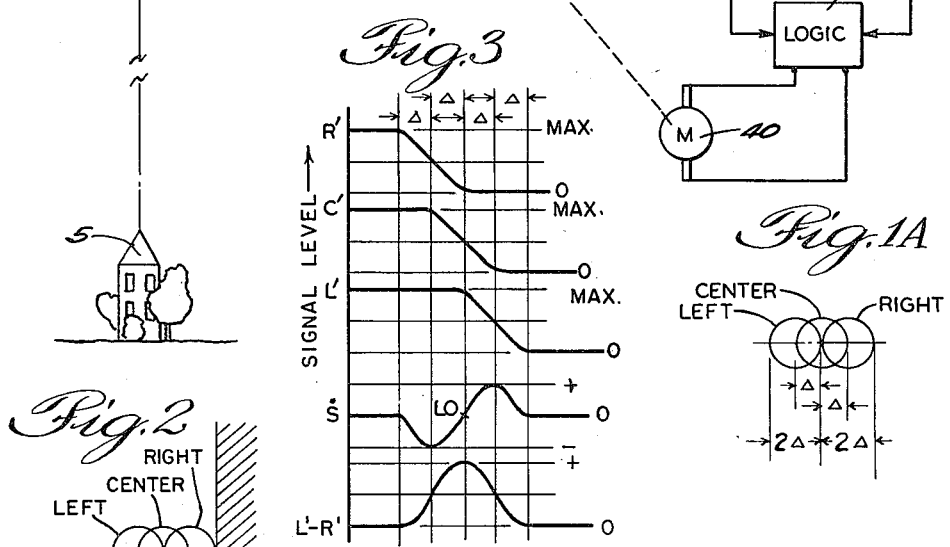
Fig. 3
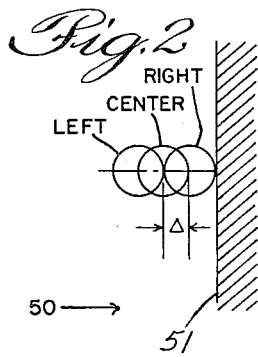
Fig. 2
INVENTORS:
Samuel P. Willits
and William L. Mohan,
BY Louis Bernos
ATTORNEYS.

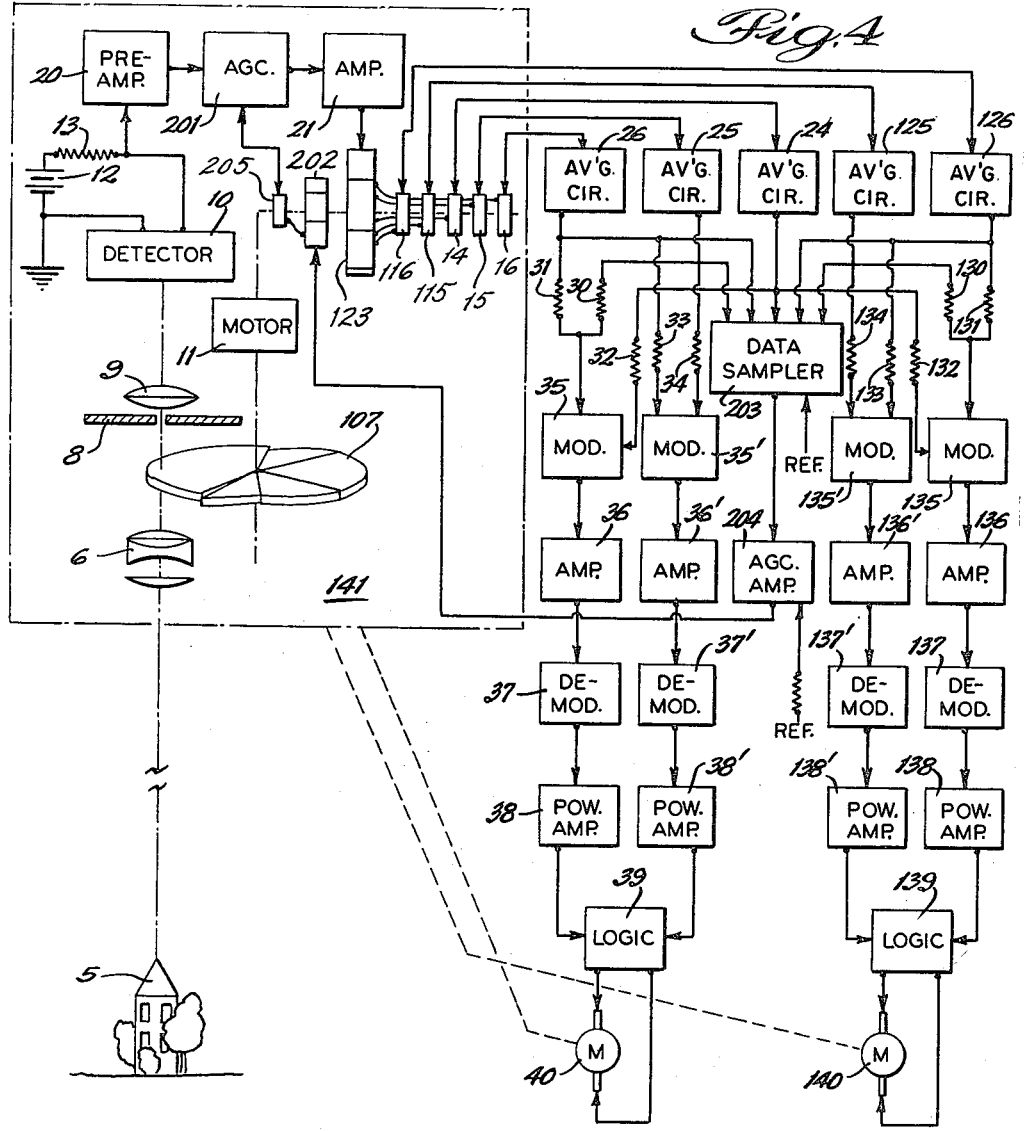
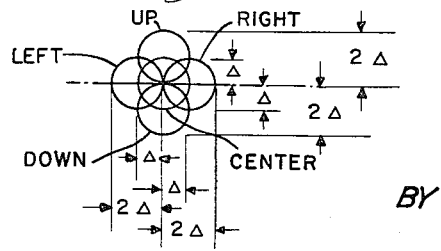

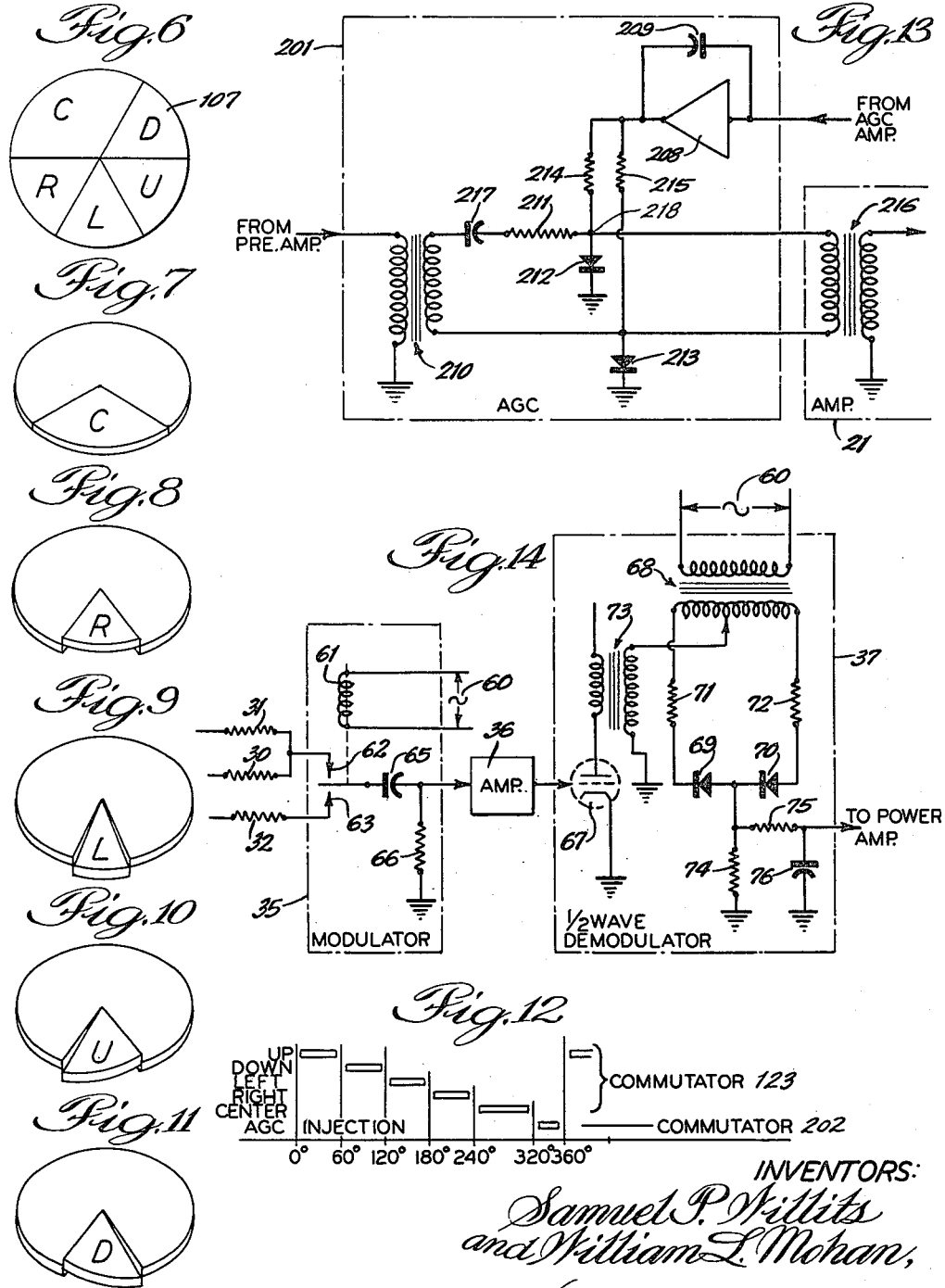

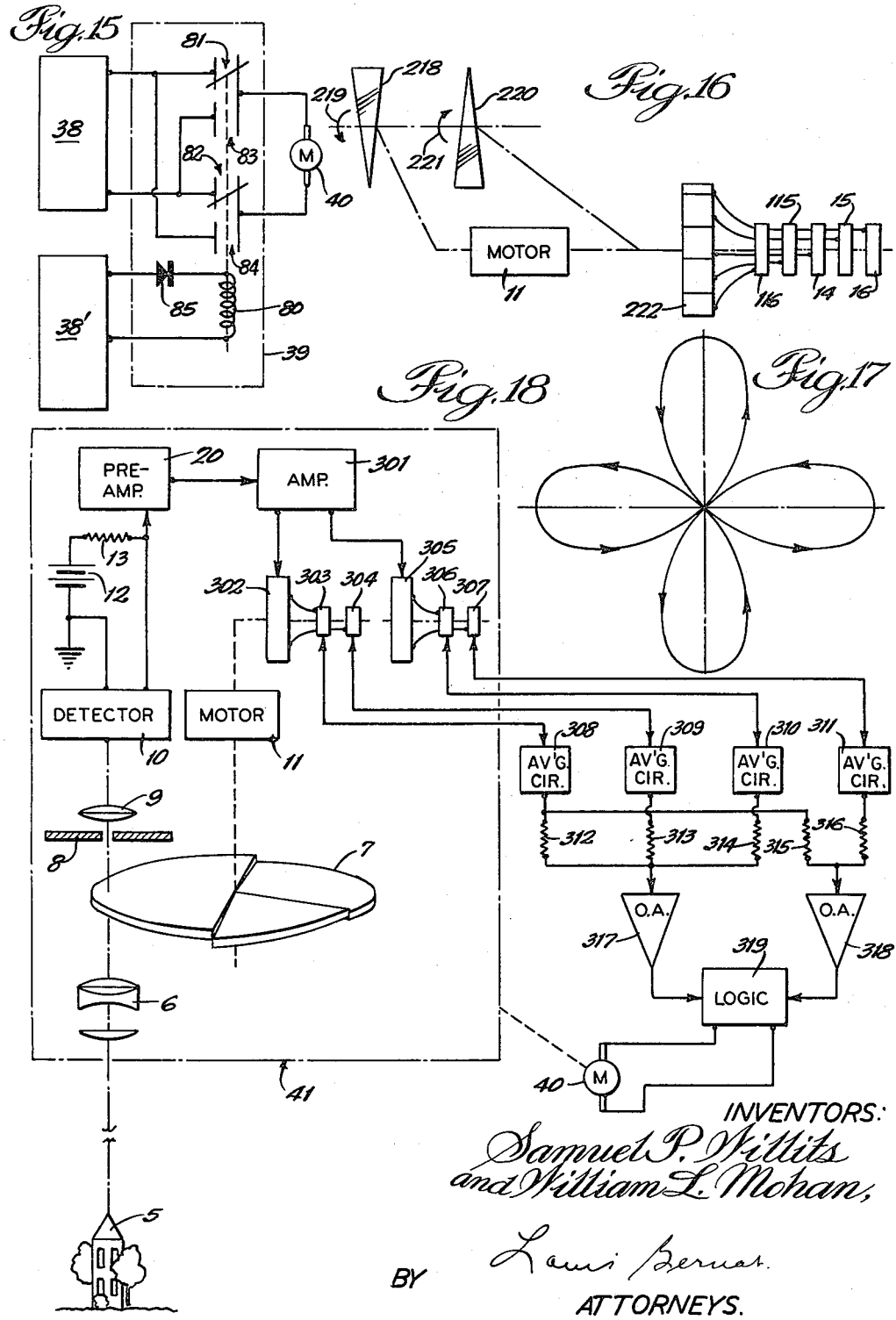

3,107,070
GUIDANCE SYSTEM
Samuel P. Willits, Mount Prospect, and William L. Mohan, Prospect Heights, Ill., assignors to Chicago Aerial Industries, Inc., Melrose Park, Ill., a corporation of Delaware
Filed Dec. 21, 1959, Ser. No. 860,744
18 Claims. (Cl. 244—14)

This invention relates generally to improvements in guidance systems and more particularly to new and improved apparatus for detecting relative angular motion between an object and a pre-selected area, and for utilizing the information obtained thereby to guide the object toward the pre-selected area or to maintain its surveillance of the area.

This application is a continuation-in-part of the copending application of Samuel P. Willits, Serial No. 710,770, filed January 23, 1958, which discloses electro-optical apparatus for sensing relative angular motion between an object and a pre-selected target area and electronic circuitry responsive to the signals supplied by the electro-optical apparatus for providing correction signals to cause the electro-optical apparatus to maintain its surveillance of the pre-selected target area.

As more fully described in the co-pending application, the image of the pre-selected target area is sequentially and periodically shifted by means of an image oscillating member with respect to a generally opaque light modulating member having at least one area transparent to the radiation received from the target area. The modulated radiation data thus obtained is transduced by a suitable radiation sensitive device to an electrical signal. This electrical signal then is processed by suitable electrical circuitry to provide correction signals if relative angular motion exists between the pre-selected field of view and the sensor apparatus of the invention. The correction signals may then be used to maintain surveillance of the pre-selected target area, or to guide a vehicle toward the same area, or both.

To achieve the maximum possible angular resolution of the pre-selected target area with the apparatus disclosed in the co-pending application, it has been found that a single radiation transmitting aperture in an otherwise opaque modulating member is desirable. With a single aperture, the modulating member may not only perform its functions as a modulator, but it also is able to function as a field stop, effectively limiting the angular coverage of the optical system. However, the utilization of any of the intelligence gathering systems heretofore known which employ a single apertured modulating member in area sensitive guidance systems, has not proved satisfactory when such systems have been used in connection with certain simple targets. A major problem in such prior art systems, which arises from an inability to lock-on, occurs with simple targets, as for example, light or dark bars, or edges against a contrasting background.

It is a general object of this invention to provide a new and improved guidance system for maintaining surveillance of a pre-selected target area.

More specifically, it is one object of this invention to provide an area sensitive guidance system of greater sensitivity than any of the prior art systems, and which successfully overcomes the difficulties presented by such known systems.

It is another object of this invention to provide a more accurate area sensitive guidance system with a minimum field of view.

Still another object of this invention is to provide an area sensitive guidance system of improved sensitivity which avoids the averaging and cancellation of radiation inherent in systems utilizing modulating members comprised of more than one aperture.

It is a primary object of this invention to provide an improved area sensitive guidance system characterized by its employment of a single apertured modulating member in combination with intelligence gathering apparatus capable of producing lock-on signals on all types of targets.

It is still another object of this invention to provide a new area sensitive guidance system of improved accuracy characterized by its simplicity of construction.

It is a more particular object of this invention to provide a new and improved area sensitive guidance system which is capable of detecting and measuring, within its field of view, any angular motion of a pre-selected target scene relative to the guidance system.

With these and other objects in view, the invention consists in the construction, arrangement and combination of the various parts of the guidance apparatus, whereby the objects contemplated are attained as hereinafter set forth. The various features of novelty which characterize this invention are pointed out with particularity in the claims appended to and forming a part of this specification. For a better understanding of the invention and its advantages, reference is had to the accompanying drawing and descriptive matter in which are illustrated and described several illustrative embodiments of the invention.

In the drawing:

FIGURE 1 is a schematic view, in block diagram form, of a simplified version of the guidance system of the invention adapted for control of a single axis.

FIGURE 1A illustrates the overlap of the selected target areas employed in the guidance system of FIGURE 1.

FIGURES 2 and 3 illustrate the effect of relative angular motion between the sensor of the invention and a simple target, and the waveforms of the electrical signals generated as a result of such relative angular motion.

FIGURE 4 is a schematic view, in block diagram form, of the guidance system of the invention adapted for two axis control.

FIGURE 5 illustrates the overlap of the selected target areas employed in the guidance system of FIGURE 4.

FIGURES 6 through 11 are views illustrating the construction of one specific embodiment of an image oscillating member in accordance with the invention.

FIGURE 12 is a bar graph representing the commutation periods achieved by the commutator of FIGURE 4.

FIGURE 13 is an electrical schematic diagram illustrating one circuit embodiment suitable for injecting automatic gain control commands into the sensor amplifying circuitry.

FIGURE 14 is a diagram, partially in block form and partially in schematic form, of a portion of the electronic circuits of the invention, and particularly illustrates modulator and demodulator circuitry which may be embodied in the invention.

FIGURE 15 is an electrical schematic diagram illustrating one form of logic circuitry which may be embodied in the invention.

FIGURE 16 is an illustrative showing of one form of image oscillating member suitable for employment in the embodiment of FIGURE 4 as an alternative to the image oscillating member there shown.

FIGURE 17 is a diagram illustrating the rosette pattern of image shift achieved by the image oscillating member of FIGURE 16, and FIGURE 18 is a schematic diagram, partially in block form, of still another embodiment of guidance system in accordance with the invention which utilizes an alternative analog computing technique.

Referring now to the drawings, and more particularly to FIGURE 1 thereof, there is illustrated a specific illustrative embodiment of a guidance system suitable for single axis control in accordance with the invention. The system of FIGURE 1 comprises a radiation sensitive device or detector of any suitable type, such as photo conductive cell 10, positioned to receive modulated light from an optical arrangement and having its output connected to a pre-amplifier 20. The sensing device or detector 10 is adapted to receive the image of a source scene or target, shown generally at 5, through optical elements appropriate both to the form of radiation sensed and to the target range. In the illustrative embodiment of FIGURE 1, the optical elements comprise an image forming objective lens 6, an opaque modulating member 8 containing a small aperture positioned in the focal plane of objective lens 6 and substantially on the optical axis thereof, a rotatable image oscillating member 7 interposed in the optical path between the lens 6 and the aperture and so positioned that rays from the image must traverse it before reaching the aperture, and a condensing lens 9 for imaging the aperture of the modulating member on the sensitive area of the detector 10.

In accordance with the embodiment of the invention shown in FIGURE 1, an oscillator drive motor 11, which may be energized by any suitable power source, is machanically connected to image oscillating member 7 for rotating the latter at some relatively high speed. A rotation speed on the order of 3000 or more r.p.m. has been found to be adavntageous although a lower speed would be acceptable under some circumstances. Generally speaking for high rates of angular motion between the sensor of the guidance system and the selected target area, sensitivity is improved with higher speeds of the image oscillating member.

As more fully described with reference to FIGURES 6 through 11, image oscillating member 7 advantageously is constructed of a plurality of pie-shaped refracting segments each having a pair of parallel faces. The segments are joined together to form a disc comprising the image oscillating member 7. The segments are joined in a predetermined manner so that their plane faces are particularly oriented with respect to the plane of rotation of image oscillating member 7 and, hence, also oriented in a particular manner with respect to the optical axis of objective lens 6. Then, as the image oscillating member 7 is rotated by motor 11, the image of the target scene is sequentially and periodically shifted with respect to the aperture of the modulating member 8 due to the refraction occurring in the rays from the image as they traverse the pie-shaped segments.

Since, as pointed out above, the aperture in modulating member 8 functions as a field stop in the optical system of the invention, the effect of sequentially and periodically shifting the image of the target scene could be achieved by re-positioning modulating member 8 without the assistance of image oscillating member 7. In other words, the image oscillating member 7 provides the functional equivalent of the re-positioning of modulating member 8. In addition, it establishes the duration of the period during which each target scene is imaged at the aperture of modulating member 8, depending on the angular extent of each pie-shaped refracting segment and rotational speed of the image oscillating member 7.

For the particular image oscillating member 7 of FIGURE 1, the target areas viewed are three in number, arranged in a line and overlapping as illustrated in FIGURE 1a. For convenience in the discussion which follows these three different viewed target areas have been designated Left, Right and Center, have a diameter of $2\Delta$ and are spaced apart by a distance $\Delta$. Although the three different target areas are arranged as illustrated in FIGURE 1A, those skilled in the art will appreciate that more or less overlap of the areas may be used, as explained more fully hereinbelow. It also will be appreciated that the shifting of the source scene image 5 at the aperture of modulating member 8 may be achieved in other ways within the teachings of the invention, and may even take different patterns such as a rosette or lemniscate, although each pattern used is effectively or actually reduced to a pattern substantially equivalent to that shown in FIGURE 1A for each controlled axis.

Radiation sensor 10 is supplied with bias by the power supply shown schematically as a battery 12 and resistor 13. When sensor 10 is exposed to the radiation of the shifting source scene 5 transmitted through the aperture of the modulating member 8, an output signal results. This output signal is applied to the input of preamplifier 20 which amplifies the high source impedance signal received and passes it as a low impedance signal to amplifier 21 for further amplification. The output of amplifier 21 is passed to a commutator 23 which is rotated in synchronism with and driven by oscillator drive motor 11. Commutator 23 advantageously is divided into a number of conducting segments electrically insulated from each other and corresponding to the number of different target areas viewed by the sensor. Thus, in the illustrative embodiment of FIGURE 1, three commutator segments are employed. In accordance with a feature of this invention, the three commutator segments advantageously are arranged or phased with respect to image oscillating member 7 so that conduction through each segment begins slightly after each shift in viewed target area and terminates slightly before the next succeeding shift, whereby transients occurring in the sensor output signal at the point of shift are removed.

Each commutator segment of commutator 23 is respectively electrically connected to a separate slip ring by which the commuted signals corresponding to Left, Right and Center may be passed to the subsequent computing and logic circuits. The three slip rings 14, 15 and 16 corresponding to the Center, Left, and Right target scene positions are connected to averaging circuits 24, 25 and 26, respectively. As explained in greater detail below, suitable circuitry connected to the outputs of averaging circuits 24, 25 and 26 utilizes the output signals therefrom to determine the magnitude and direction of an error signal resulting from any relative angular motion between the pre-selected target scene 5 and the sensory apparatus of the invention. The error signal, if any, is applied to a servo motor or torquer 40 which, in turn, applies corrective forces to the platform 41 on which the sensor apparatus is located. These corrective forces serve to re-establish the pre-selected target scene at substantially the pre-selected angular location relative to the sensor of the invention. It will be apparent to those skilled in the art that the platform 41 may be acted on by motor 40, or if platform 41 is fixed to a steerable vehicle, the vehicle may be steered by the action of motor 40, or both.

In order that the character of the electrical signals supplied to the averaging circuits 24, 25, and 26 may become more apparent and so that the nature of the computations performed to derive the control signal for motor 40 may be more clearly understood, examples with reference to FIGURES 2 and 3 will be considered. Since the radiation sensor 10 is responsive to all the points of contrast in its field of view, it functions as an averaging device averaging all contrast points in its field to provide an average D.C. output signal level for any one field of view. Thus, when three distinct fields are utilized in sequence, three separate sensor output signals result. Considering now FIGURE 2, the three distinct fields of view imaged at the aperture of modulating member 8 by the action of the image oscillating member 7 and objective lens 6 of applicants' invention are again diagrammatically represented as three circles designated Left, Center, and Right and are superimposed on a light uniform diffused field. If the three fields, Left, Center and Right move in the direction of arrow 50 and traverse an edge 51 to enter a uniform dark field, the average radiation sensor signal level for any position of each of the three fields of view as they move from the light to the dark fields is illustrated in FIGURE 3 wherein L′, C′, and R′ designate the average sensor signal level corresponding to any position of the fields of view Left, Center, and Right respectively.

In FIGURE 3, the ordinates are representative of the average sensor signal level for the intervals during which the sensor is looking at a particular field of view in a particular position relative to edge 51, i.e., any value of R′ indicated in FIGURE 3 is the average output level of the sensor during the interval it is exposed to the radiations from the Right field of view for a particular position of that field of view relative to edge 51. This also applies to the values of L′ and C′ for the Left and Center fields of view, respectively. Also, the abscissae in FIGURE 3, labeled V, X, W, Y, and Z are each spaced from the other by the distance Δ, and correspond to equal increments Δ in the positions of each of the three fields of view Left, Center, and Right as they move in the direction of arrow 50 to traverse edge 51. Thus, "V," corresponds to the first point on the periphery of the field of view designated Right to contact edge 51 when the three fields of view move in the direction of arrow 50; "W" and "X" correspond to the first points where fields of view, Center and Left, respectively, contact edge 51; and "Y" and "Z" correspond to the last points on the periphery of fields, Center and Left, respectively, to contact edge 51.

While the signals L′, C′, and R′ contain intelligence relative to the movement of their respective fields of view, the intelligence present is not in a form useful for establishment of a lock-on by a servo system. In accordance with a unique feature of this invention, applicants have found that the second space derivative of the signals L′, C′, and R′ results in a useful servo signal, and this second space derivative servo signal is utilized to control the guidance system.

To assist in defining the particular case over the general theory, the term "space derivative" has been employed herein in preference to the more general mathematical expression, "space variation." As employed herein the first space derivative is defined as the spatial rate of change of scene brightness in a given direction, i.e., the limiting value of the ratio of the difference of the values of brightness of two points in the visual field to the angular separation of the two points as the angular separation approaches zero. The second space derivative is defined as the spatial rate of change of the first space derivative, i.e., the limiting value of the ratio of the difference of values of the first space derivative of two points in the visual field to the angular separation of the two points as the angle between the two points approaches zero.

The value of the first space derivative at any point in the visual field may be approximated by the value of the ratio of the differences of brightness values of two closely spaced areas in the visual field to their angular separation. This approximation becomes more exact as the spacing between the two areas is reduced and as the physical size of the two areas is reduced. This approximation may be stated mathematically utilizing the nomenclature defined above as:

$$S \approx \frac{L' - R'}{2\Delta}$$

where $S$ = the first space derivative.

A good approximation to the value of the second space derivative may be found by computing the value of the ratio of the differences of approximations to the rate of change of brightness values of two sets of two closely spaced areas in the visual field to their angular separation. The two sets of two closely spaced areas may share a common area; in this case the common area is Center. This approximation may be stated as follows utilizing the nomenclature defined above as:

$$\dot{S} \approx \frac{\left(\frac{L' - C'}{\Delta}\right) - \left(\frac{C' - R'}{\Delta}\right)}{\Delta}$$

were $\dot{S}$ = the second space derivative. Since the factors Δ and 2Δ in the foregoing expressions are constants, they are only a proportionality factor and for simplicity may be omitted. Then:

$$\dot{S} \approx (L' - C') - (C' - R')$$
$$\approx L' + R' - 2C'$$

The results when $\dot{S}$ is computed and plotted from the signals L′, C′, and R′ are illustrated in FIGURE 3. An inspection of the curve representing $\dot{S}$ reveals a potentially ideal servo control signal, but possessed of ambiguities in areas removed from the desired lock-on point, which is designated by the letters LO. However, if the difference between the signals L′ and R′ is used as a signal controlling the polarities of the servo control signal $\dot{S}$, the ambiguities are resolved and the servo system will always drive toward the lock-on point. This L′−R′ signal for the example of FIGURE 2 is also plotted in FIGURE 3. Thus, assigning polarities to the example of FIGURES 2 and 3, the following table results.

*Table I*

| Polarity Control Signal L′−R′ | Servo System Signal $\dot{S}$ | Direction of Servo System Drive |
|---|---|---|
| + | − | Right. |
| + | + | Left. |
| − | − | Left. |
| − | + | Right. |

Obviously, computation of the space derivative in reverse, as for example $(C'-R')-(L'-C')$, would require opposite control polarities from those indicated in Table I, but it otherwise is completely equivalent thereto. Although other simple targets, such as bars, yield differently shaped curves for the space derivative $\dot{S}$ and the difference signal L′−R′, all target areas, whether simple, such as bars and edges, or complex, such as the target illustrated at 5 in FIGURE 1, yield positive lock-on signals using the combination of the space derivative $\dot{S}$ and the difference signal L′−R′. Only uniformly diffuse fields, which are practically unknown in the works of nature or man, can serve to adversely affect the lock-on abilities of this invention.

Since the amplified and commutated sensor signals each are essentially D.C. signals with superimposed noise and of a duration corresponding to the commutation period, advantageously the signals should be averaged and maintained for one revolution or more of the oscillating member 7 prior to any computation. This function is performed in the instant embodiment by conventional RC averaging circuits 24, 25 and 26 which receive the signals C′, L′, and R′ respectively. Preferably, each of the averaging circuits has an RC time constant equal to the duration of its associated commutation period. Thus, if the oscillating member 7 and commutator 23 are being rotated at a given speed, such as 5000 r.p.m., and the commutation angle for signal C′ is 160° and for signals L′ and R′ each 70°, the RC time constant for averaging circuit 24 would be substantially 5.3 milliseconds and for averaging circuits 25 and 26, substantially 2.3 milliseconds each. To prevent undue drain on the averaging capacitor of each of the averaging circuits, a low-impedance cathode follower output advantageously may be provided.

The computation of Ṡ then is performed in the circuit elements comprised of matched resistors 30, 31 and 32, and modulator 35. Resistors 30 and 31, connected at their inputs to averaging circuits 25 and 26, respectively, and with their outputs tied together in conventional manner, function as a summing network providing at their output one-half the sum of signals $L'+R'$. This summed output is connected as one input to modulator 35.

Modulator 35 is illustrated in greater detail in FIGURE 14 of the drawing, and in this embodiment takes the form of conventional electro-mechanical chopper whose coil 61 is powered by an A.C. source schematically indicated at 60. Preferably, the A.C. source 60 is of a frequency five or more times higher than the frequency response expected of the system. In practice, it has been found that a frequency of source 60 on the order of 400 to 800 cycles per second covers the band width requirements of the servo system. In addition to the signal $$\frac{L'+R'}{2}$$

impressed on contact point 62, signal C' from the output of integrator 24 passed through resistor 32 is impressed on the second contact 63 of modulator 35. Armature 64, oscillating between contacts 62 and 63 in response to the cyclic variations of source 60, provides an A.C. output across condenser 65, which, measured peak to peak, is the difference of the input signals or the second space derivative Ṡ. Resistor 66 functions as a D.C. restorer providing a D.C. path to ground as condenser 65 is charged and discharged.

The output of modulator 35 is impressed on an A.C. amplifier 36 of conventional design which is prevented from saturating by circuit provisions explained further hereinbelow with reference to FIGURES 4 and 13. The A.C. output of amplifier 36 is connected through coupling triode 67 to a half wave demodulator 37 which forms the plate load of triode 67.

Demodulator 37 advantageously is comprised of transformer 68, diodes 69 and 70, and current limiting resistors 71 and 72. The demodulator is coupled to the plate of triode 67 by means of transformer 73. With a demodulator of this type, an A.C. reference voltage is necessary to demodulate the input signal and, in accordance with an aspect of this invention, the same A.C. voltage source 60, supplied as a reference to modulator 35, also is utilized as the reference supply for demodulator 37.

Manifestly, other embodiments of modulators and demodulators may be employed in lieu of the illustrative embodiments shown, i.e., demodulator 37 may be replaced by an additional pair of contacts in modulator 35 or modulator 35 may take the same general form as that of demodulator 37. However, an electromechanical modulator presently is preferred because of its freedom from drift.

The half wave output of the demodulator is filtered in the RC filter comprised of resistor 75 and capacitor 76 to convert the pulsating output to an average D.C. level proportional to Ṡ. Resistor 74, connected between the demodulator output and ground, functions as a D.C. restorer.

The filtered output of demodulator 37 is utilized to control a power amplifier 38 which may be of any suitable type, such as a magnetic amplifier. The power amplified D.C. output is applied to logic circuit 39 which determines the polarity to be applied to a conventional D.C. servo motor 40 in accordance with the polarity control signal, $L'-R'$.

The polarity control signal, $L'-R'$, is computed in modulator 35', which in all respects except for inputs, advantageously may be made identical to modulator 35. The inputs to the contacts 62' and 63' of modulator 35' are the D.C. signals L' and R' developed across matched resistors 34 and 33 respectively. Armature 64', oscillating between contacts 62' and 63' in response to the cyclic variation of source 60, provides an A.C. output which is the difference of the input signals or the polarity control signal, $L'-R'$.

The polarity control signal, $L'-R'$, then is processed in a manner identical to that described for the space derivative signal Ṡ. That is, it is amplified in A.C. amplifier 36', demodulated and filtered in demodulator 37' and utilized to control a power amplifier 38' whose output is applied to logic circuit 39. It should be understood that amplifier 36', demodulator 37', and power amplifier 38' are substantially identical to amplifier 36, demodulator 37 and power amplifier 38, respectively, whose operation has been described hereinabove.

One illustrative embodiment of logic circuit 39 is illustrated in FIGURE 15 and is comprised of a relay coil 80, its normally closed contacts 81 and 82, and its normally open contacts 83 and 84. Opposite polarities of the D.C. output of power amplifier 38 are impressed on the contacts of contact pair 81—83, and on the contacts of contact pair 82—84 as shown, with the polarity of each contact at any instant being determined by the polarity of the space derivative servo control signal, Ṡ, at the same instant.

The polarity control signal $L'-R'$, from power amplifier 38' is connected through a diode 85 to relay coil 80 of the logic circuit. Thus, a change in the polarity of the $L'-R'$ signal will in turn reverse the polarity of the space derivaive signal, Ṡ, applied to servo motor 40.

In the foregoing description, the use of a D.C. type servo motor 40 and corresponding D.C. outputs of power amplifiers 38 and 38' should not be construed as a limitation on the invention. Those skilled in the art will understand that it is equally feasible to use an A.C. servo motor and corresponding A.C. outputs of the power amplifiers. Obviously, with the circuitry shown for the logic circuit 39, the output of amplifier 38' is desirably D.C., but the addition of conventional detecting means at the input of the relay coil 80 would permit an A.C. output of amplifier 38'.

The foregoing description is concerned with a single axis version of the guidance system of the invention wherein several circuit refinement details have been omitted to simplify the description. For two axis operation of the guidance system, reference will now be made to FIGURE 4 wherein circuit elements identical to those of FIGURE 1 are identified by the same reference numerals.

For two axis operation, the invention merely requires duplication of certain elements and the revision of the image oscillating member to accommodate two axis operation. In the two axis controlled guidance system of FIGURE 4, there is no change in the basic inventive concepts described in conjunction with the system of FIGURE 1. While a two axis controlled guidance system may be achieved in accordance with FIGURE 4, obviously two axis operation also can be achieved by two completely separate systems of the first embodiment described hereinabove.

In FIGURE 4, the image oscillating member 107 advantageously is constructed of a plurality of pie-shaped refracting segments so joined together that the radiation received from source scene 5 is effectively shifted between five different and overlapping target areas. These target areas arbitrarily may be designated Left, Right, Center, Up and Down and are arranged as indicated in FIGURE 5. The overlap illustrated presently is believed to be the optimum since either more or less overlap adversely affects the sensitivity of the system. Less overlap of the target area results in an increased field size and directly reduces the ability of the system to detect small errors. Increased overlap, while feasible as long as five different target areas remain, requires increasingly precise circuitry to distinguish between the signals resulting from each field.

Operation of the image oscillating member 107 can be explained with reference to FIGURES 6 through 11, which illustrates the construction of the member in particular detail. An orthographic representation of the image oscillating member 107 is shown in FIGURE 6, wherein may be seen the five refracting segments designated C, R, L, U and D which shift the fields of view to Center, Right, Left, Up, and Down respectively. If each of these five segments are angularly disposed with respect to each other, it can be seen that light or other radiant energy passing through each segment will be refracted to a different position. In FIGURE 7, segment C corresponding to the Center target area of FIGURE 5 is illustrated. Both surfaces of segment C are plane and parallel, oriented at right angles to the optical axis of objective lens 6, and in the plane of member 107 so that no lateral displacement takes place as the light rays of the target image traverses this segment. In FIGURE 8, segment R corresponding to the target area designated Right in FIGURE 5 is illustrated. Both surfaces of segment R are plane and parallel, and the segment is inclined upwardly from the center of the image oscillating member 107. Thus, light passing through the segment R is refracted, and the area designated Right in FIGURE 5 is imaged at the aperture of modulating member 8. This same manner of construction is utilized for segments L, U and D although with different angles of inclination relative to the plane of member 107, as illustrated in FIGURES 9, 10 and 11 respectively so that the areas designated Left, Up and Down in FIGURE 5 will be sequentially imaged at the aperture of modulating member 8 as image oscillating member 7 is rotated.

Modulating member 8, as described hereinabove, is of opaque material with a round transparent area or aperture contained therein. In one embodiment constructed in accordance with the invention, the aperture utilized was 0.004" diameter and positioned at the focus of an f1.6 objective lens of two inch focal length. In that embodiment, for the most unfavorable initial target position the acquisition error was substantially two milliradians and sensitivity to relative angular motion was less than one minute of arc.

The shifting image of the source scene 5 at the aperture of modulating member 8 results in an output signal from sensor 10 representative of the scene imaged. As shown in FIGURE 4, this sensor output is passed to preamplifier 20 for amplification in the same manner as explained hereinabove with respect to the circuit of FIGURE 1. The output of preamplifier 20 is passed through an AGC injection circuit 201 to amplifier 21. The operation of the AGC injection circuit is explained further hereinbelow.

The output of amplifier 21 is commutated at commutator 123 and distributed through five separate slip rings 116, 115, 14, 15 and 16 corresponding to the five different source scenes, Down, Up, Center, Left and Right. To perform this commutation, commutator 123 is rotated in synchronism with image oscillating member 107 and is comprised of five separate conducting segments electrically insulated from each other. The angular extent of all five conducting segments is substantially 320° leaving an approximate dead zone of 40° utilized by still another another commutator 202 for AGC injection. The overall commutation pattern of both commutators 123 and 202 is illustrated in FIGURE 12.

If the second space derivative $\dot{S}$ computed in accordance with the circuit of FIGURE 1 for the axis defined by the Left, Center and Right source scenes is defined as $\dot{S}_1$, then $\dot{S}_1$ is computed in the embodiment of FIGURE 4 in an identical manner to that described hereinabove. Also, if the second space derivative computed for the quadrature axis and defined by the Up, Center and Down source scenes is designated $\dot{S}_2$, the space derivative $\dot{S}_2$, and its corresponding polarity control signal, U'—D', are computed in an identical manner to $\dot{S}_1$ and its polarity control signal L'—R'. That is, averaging circuits 125 and 126 are identical to averaging circuits 25 and 26; resistor 130, 131, 132, 133 and 134 are identical to resistors 30, 31, 32, 33 and 34, etc. The $\dot{S}_2$ space derivative servo control is polarity controlled by the U'—D' signal in logic circuit 139 to cause servo motor 140 to correct any error signals resulting from relative angular motion of platform 141 in the Up, Center, Down axis. From the foregoing, it can be seen that the guidance device illustrated in FIGURE 4 is effective to cause a pre-selected target scene to remain locked within narrow limits about the intersection of two distinct axes relative to the sensor apparatus of the invention.

To insure linear operation and constant loop gain of the computing circuitry of FIGURE 4 and particularly amplifiers 36, 36', 136 and 136', additional circuit provisions are required. It is a feature of this invention that an AGC or automatic gain control circuit is employed to maintain linear operation of the computing circuitry.

In the embodiment of FIGURE 4, the raw data employed in the AGC circuit is the output of the five averaging circuits 24, 25, 26, 125 and 126. The D.C. output of these averaging circuits is connected to the input of a data sampling circuit 203. The data sampling circuit 203 advantageously may comprise a five stage ring counter triggered by an external A.C. source 206. This source in the instant embodiment desirably is of relatively high frequency, a 4 kc. frequency having proved advantageous. The ring counter circuit, which may be of any conventional design, is utilized to produce gate pulses which sequentially energize five separate clamping circuits each of whose outputs are tied to a common output line. Advantageously the clamping circuits may each be comprised of a unilateral type semiconductor device whose base is connected to a ring counter output and whose one emitter is connected to one of the averaging circuit outputs. Thus, when a positive ring gate pulse is present on the base, the one emitter tied to the averaging circuit and the other emitter are clamped together, and a pulse is produced on the common output line, which pulse has an amplitude corresponding to the averaging circuit output.

The output of the data sampler 203 is passed to an AGC amplifier circuit 204. The AGC amplifier 204 is comprised of a conventional A.C. amplifier, a full wave rectifier and a filter in that order. In this manner, the sampled data is amplified, rectified and filtered to a smooth D.C. level that varies in accordance with the outputs of the several averaging circuits. The AGC level is determined by this D.C. level whenever it rises above a D.C. reference voltage supplied at 207.

AGC control signals are passed from AGC amplifier 204 to the commutator 202 rotating in synchronism with commutator 123. In the illustrative embodiment of FIGURE 4, commutator 202 advantageously has one conducting segment phased in relation to the segments of commutator 123 in the manner indicated in FIGURE 12. The commutated AGC signals then are passed to slip ring 205, and thence to the AGC injection circuit 201. Operation of the AGC injection circuit may best be explained by reference to FIGURE 13.

The sensor output as amplified in preamplifier 20 is coupled to the AGC injection circuit by transformer 210, and appears across resistor 211 at connection 218. Capacitor 217 decouples the injection circuitry from the low impedance secondary of transformer 210. Silicon diode 212, at low signal amplitudes is essentially an open circuit so that for low amplitudes of the sensor signal the entire signal is passed to coupling transformer 216 in amplifier 21. However, if a small current is applied through resistor 214 to connection 218, the resistance of diode 212 falls and a portion of the signal appearing at connection 218 is shunted to ground. The current applied at connection 218 is supplied by the AGC amplifier output signal through commutator 202 and slip ring 205. This AGC signal is applied to a holding circuit, comprised of amplifier 208 and capacitor 209, which maintains the signal voltage applied during the intervals when signal is not passed through the commutator. Advantageously, the time constant of the holding circuit is relatively long to prevent pulsations from appearing in the injection circuitry. To this end, a time constant of five or more times the period of the oscillating member's rotational frequency has proved desirable.

To prevent the AGC injection from introducing spurious signals into the guidance system, a second injection circuit comprised of silicon diode 213 and resistor 215 is employed. This second injection circuit is connected to the output of the holding circuit and the second leg of transformer 210. Since the injections on this second leg are shifted 180° in phase from the injections on the opposite leg, pulsations are eliminated and the only effect of the AGC injection is the effect intended, namely, a control of the D.C. level of the amplified sensor signals which prevents their excursion beyond a desired band.

In the illustrative embodiments of FIGURES 1 and 4, the image oscillating members 7 and 107 respectively are each shown to be disc-like with pie-shaped segments of the disc canted from the plane of the disc to effect a shifting of the source scene image in discrete steps. In FIGURE 16, another arrangement for shifting the source scene image is illustrated. In accordance with the embodiment of FIGURE 16, two contra-rotating optical wedges are employed to achieve the rosette pattern of movement of the image illustrated in FIGURE 17 which shows the displacement of a point in the image area.

To achieve the image pattern of FIGURE 17, wedge 218 is rotated about the optical axis in the direction of arrow 219 at an angular rate of $3\omega$ by motor 11 which simultaneously rotates wedge 220 about the optical axis in the direction of arrow 221 at an angular rate of $\omega$. In this manner, five different but overlapping source scenes are imaged at the aperture of the modulating member 8 (not illustrated in FIGURE 16).

The image oscillation pattern of FIGURE 17 requires a different commutator arrangement than that described in conjunction with the circuit of FIGURE 4 since the image traverses the center four times in the course of tracing out the rosette. Consequently, commutator 222 advantageously is provided with four conducting segments alternating between the conducting commutator segments for Left, Right, Up, and Down, and all electrically interconnected to replace the single "Center" segment employed in commutator 123. Commutator 222 is rotated by motor 11 at an angular rate of $\omega$ in the same direction as wedge 220.

Those skilled in the art will appreciate that still other means for achieving, actually or effectively, the shifting of the source scene image necessary to the employment of the space derivative servo control signal may be provided in accordance with the principles of the invention. Among the methods contemplated, but not here specifically illustrated, are shifting of the sensor 10 and/or the modulating member 8. Also the aperture of modulating member 8 may be replaced by uniquely patterned reticle accompanied by the rotation of another patterned reticle also located on the optical axis. From the foregoing, it can be seen that many techniques may be employed to oscillate the image of the source scene and that the successful practice of the instant invention is not limited to the employment of any one particular method or means.

As set forth in detail above, both of the embodiments of FIGURES 1 and 4 utilize the same computing principle. However, the manner of computation described in conjunction with these embodiments does not form a limitation on the invention. Many other computing techniques, both analog and digital may be used as is apparent to persons skilled in the computing art. For example, applicants have successfully employed the alternative analog computing technique which is illustrated in FIGURE 18 wherein only those elements essential for a full understanding of this embodiment of the invention are shown.

In FIGURE 18 the sensing device 10 is adapted to receive the inputs of the source scene in the same manner as previously described in conjunction with the circuit of FIGURE 1. The outputs of the sensor corresponding to the three target areas, Left, Right, and Center are transmitted to preamplifier 20 from which they are, in turn, transmitted to amplifier 301. Amplifier 301 is similar to amplifier 21, previously described, but in addition, advantageously comprises a phase inversion circuit to give two separate outputs 180° out of phase with respect to each other.

The two separate outputs of amplifier 301 are passed to two separate commutating members 302 and 305. The commutator 302 comprises two conducting segments corresponding to the L' and R' signals and further comprises a non-conducting segment in the time phase region of the C' signal. The commutated L' and R' signals are transmitted to averaging circuits 308 and 309, respectively, by slip rings 303 and 304, respectively.

Commutator 305 also contains two conducting segments. However, these segments correspond to minus C' and minus R' signals. A non-conducting zone on the commutator corresponds to the minus L' signal. The commutated minus C' and R' signals are transmitted by slip rings 306 and 307 to averaging circuits 310 and 311, respectively. All four averaging circuits 308, 309, 310 and 311 advantageously are identical to the averaging circuits described in conjunction with the circuit of FIGURE 1. The second space derivative signal, $\ddot{S}$, is computed from the D.C. signal outputs of averaging circuits 308, 309 and 310. The outputs of averaging circuits 308 and 309 each are connected to series resistors 312 and 313, respectively, which advantageously are a matched pair. The resistor outputs are tied together in conventional summing network. The output of averaging circuit 310 is fed through a series resistor 314, whose resistance is one-half that of resistors 312 and 313, and is also tied to the output of the summing network. The output of the summing network is then transmitted to operational amplifier 317. The output of amplifier 317 is the second space derivative servo control signal $\ddot{S}$ and is transmitted to the logic circuit 319.

In a manner similar to the above computation of $\ddot{S}$, the polarity control signal L'—R' is computed in a matched pair of resistors 315 and 316 and operational amplifier 318. The polarity control signal at the output of amplifier 318 is fed as the second input to logic circuit 319, which advantageously is similar in construction to logic circuit 39 previously described. The output of logic circuit 319 is utilized to control servo motor 40, which serves to re-establish the pre-selected angular relationship between the sensor and the source scene.

From the above description it will be apparent that this invention provides a novel and unique area sensitive guidance system which overcomes the various deficiencies of the systems previously known. While various specific embodiments and arrangements have been illustrated in the above description, it will of course be understood that details of configuration and construction of the invention may be varied through a wide range without departing from the principles of the invention and scope thereof. It is therefore not intended to limit the patent granted hereon otherwise than necessitated by the scope of the appended claims.

What is claimed as the invention is:

1. An improved guidance system for sensing relative angular motion between an object and a target scene and for generating correction signals to maintain the object aligned on the target scene comprising radiation sensitive means adapted to receiving radiations from said target scene; optical means for directing said radiations on said radiation sensitive means including lens members, an opaque member having a single aperture at the focal plane of at least one of said lens members, and shifting means for oscillating a plurality of different and overlapping target area images at the single aperture of said opaque member; amplifying means connected to the output of said radiation sensitive means for receiving signals representative of the overlapping target area images; commutator means rotating in synchronism with said oscillating means and having a plurality of segments each corresponding to a different one of said overlapping target area images; a plurality of separate averaging networks; conductor means sequentially connecting the output of said amplifying means to said commutator segments and connecting the output of each segment to a separate one of said averaging networks; electronic circuit means connected to the outputs of the averaging networks for computing the magnitude and direction of an error signal resulting from any relative angular motion between the object and the target scene; and servo motor means connected to the output of said electronic circuit means and responsive to said error signal for reestablishing the target scene at its initial attitude relative to said radiation sensitive means.

2. An improved guidance system in accordance with claim 1 wherein said error signal comprises the spatial rate of change of the spatial rate of change of target scene brightness as derived from the outputs of said radiation sensitive means.

3. An improved guidance system for sensing relative anglar motion between an object and a target scene and for generating correction signals to maintain the object aligned on the target scene comprising radiation sensitive means adapted to receive radiations from said target scene; optical means for directing said radiations on said radiation sensitive means including lens members, an opaque field stop having a single aperture at the focal plane of at least one of said lens members, and image oscillating means interposed in the path of said directed radiations for shifting a plurality of different and overlapping target area images at said single aperture of said field stop, electronic circuit means connected to said radiation sensitive means for receiving signal outputs representative of the scene brightness of the overlapping target area images and for computing therefrom the spatial rate of change of the spatial rate of change of scene brightness for providing a control signal, logic circuit means for receiving said control signal and for providing a servo control signal therefrom representative of the relative angular motion between the object and the target scene, and servo motor means connected to the output of said logic circuit means and responsive to said servo control signal to reestablish the target scene at its initial attitude relative to said radiation sensitive means.

4. An improved guidance system in accordance with claim 3 wherein said image oscillating means comprises a rotating segmented member having a plurality of refracting segments angularly disposed with respect to each other such that the radiant energy passing through each segment is refracted to a different position to cause the target area images to be overlapping.

5. An improved guidance system in accordance with claim 3 wherein said image oscillating means comprises a rotating disc-like member formed of a plurality of refracting segments each canted from the plane of said member to effect overlapping of the target area images.

6. An improved guidance system in accordance with claim 3 wherein said image oscillating means comprises a pair of contra-rotating optical wedges, spaced from each other along a common axis of rotation, for oscillating the target area image in accordance with a determinable pattern.

7. An improved guidance system in accordance with claim 3 wherein said electronic circuit means comprises a plurality of averaging circuits respectively connected to receive the signal outputs of said radiation sensitive means corresponding to the plurality of target area images passed through said oscillating means, a plurality of summing resistors forming a summing network connected to the outputs of said averaging circuits, and a plurality of modulator circuits connected at their inputs to said summing network and adapted to provide at their outputs a control signal related to the spatial rate of change of the spatial rate of change of brightness in said target scene for permitting establishment of object lock-on by said servo motor means.

8. An improved guidance system for sensing relative angular displacement between an object and a target scene and for generating correction signals to maintain the object aligned on the target scene comprising radiation sensitive means adapted to receiving radiations from said target scene; optical means for directing said radiations on said radiation sensitive means, an opaque light restricting member having a single aperture at a focal plane of said optical means and image oscillating means interposed in the path of said directed radiations for oscillating a plurality of target area images at the single aperture of said light restricting member; a plurality of averaging circuits; means for sequentially applying the signal outputs of said radiation sensitive means representative of said target area images to the respective inputs of said plurality of averaging circuits; electronic circuit means connected to the outputs of the averaging circuits for computing the magnitude and direction of an error signal resulting from any relative angular displacement between the object and the target scene; and servo motor means connected to the output of said electronic circuit means and responsive to said error signal to re-establish the target scene at its initial attitude relative to said radiation sensitive means.

9. An improved guidance system in accordance with claim 8 wherein said electronic circuit means comprises at least one signal transmission link for computing a control signal related to the spatial rate of change of the spatial rate of change of brightness in said target scene signal, at least one signal transmission link for computing a polarity control signal, and a logic circuit connected to receive said control signal and said polarity control signal for providing the servo motor means with said error signal.

10. A single axis controlled guidance system for sensing relative angular motion between an object and a target scene and for generating correction signals to maintain the object aligned on the target scene comprising radiation sensitive means adapted to receive radiations from said target scene; optical means for directing said radiations on said radiation sensitive means including lens members, an opaque member having a single aperture at the focal plane of at least one of said lens members, and rotatable image oscillating means comprised of a plurality of radiation transmitting elements for oscillating a plurality of target area images at the single aperture of said opaque member; a plurality of averaging circuits; means for sequentially applying the signal outputs of said radiation sensitive means representative of said target area images to the respective inputs of said plurality of averaging circuits, a pair of signal transmission links connected to the outputs of said averaging circuits, one of said links comprising means for computing a control signal related to the spatial rate of change of the spatial rate of change of brightness of said target scene and the other of said links comprising means for computing a polarity control signal, logic circuit means responsive to said control signal and said polarity control signal for providing a servo control signal the polarity and magnitude of which are representative of the relative angular motion between the object and the target scene; and servo motor means connected to the output of said logic circuit means and responsive to said servo control signal to re-establish the target scene at its initial attitude relative to said radiation sensitive means.

11. A single axis controlled guidance system in accordance with claim 10 wherein each of said signal transmission links comprises a summing circuit connected to said averaging circuits, modulating means connected to said summing circuit, and demodulating means connected to receive the ouput of said modulating means, and having its output, in turn, connected to said logic circuit means.

12. A two axis controlled guidance system for sensing relative angular displacement between an object and a target scene and for generating correction signals to maintain the object aligned on the target scene comprising radiation sensitive means adapted to receive radiations from said target scene; optical means for directing said radiations on said radiation sensitive means, and image oscillating means interposed in the path of said directed radiations for oscillating a plurality of target area images at the single aperture of said modulating member; a plurality of averaging circuits; means for sequentially applying the signal outputs of said radiation sensitive means representative of said target area images respectively to said plurality of averaging circuits, a pair of signal transmission links for each axis connected to the output of said averaging circuits for computing the magnitude and direction of an error signal resulting from any relative angular displacement between the object and the target scene, and servo motor means connetced to the output of each pair of signal transmission links and responsive to said error signal, and outputs of both servo motor means controlling a separate axis to re-establish the target scene at its initial attitude relative to said radiation sensitive means.

13. A two axis controlled guidance system in accordance with claim 12 further comprising data sampling means connected to the output of said averaging circuits and automatic gain control means having its input connected to said data sampling means and its output connected to the output of said radiation sensitive means for maintaining the signal voltage level applied to the averaging circuits between predetermined limits.

14. An improved guidance system for sensing relative angular motion between an object and a target scene and for generating correction signals to maintain the object aligned on the target scene comprising radiation sensitive means adapted to receive radiations from said target scene; optical means for directing said radiations on said radiation sensitive means including lens members, an opaque member having a single aperture at the focal plane of at least one of said lens members, and image oscillating means interposed in the path of said directed radiations for shifting a plurality of overlapping target area images at the single aperture of said opaque member; phase inverter means connected to the radiation sensitive means for receiving signals representative of the overlapping target area images and providing two outputs 180° out of phase with each other, a plurality of separate averaging networks, conductor means connecting each output of said phase inverter means sequentially to the separate averaging networks, electronic circuit means connected to the outputs of the averaging networks for computing the magnitude and direction of an error signal resulting from any relative angular motion between the object and the target scene; and servo motor means responsive to said error signal to re-establish the target scene at its initial attitude relative to said radiation sensitive means.

15. An improved guidance system in accordance with claim 14 wherein said conductor means comprises a first commutator means connected to receive one output of said phase inverter circuit and for applying only selected image signals therefrom to a first group of averaging networks, and second commutator means connected to receive the other output of said phase inverter circuit for applying only selected image signals therefrom to a second group of averaging networks.

16. An improved guidance system in accordance with claim 15 wherein said electronic circuit means comprises a summing network connected to the output of said first and second group of averaging networks, a pair of signal transmission links for providing servo control and polarity control signals respectively and logic means connected to said links and responsive to the signals therefrom to apply an error signal to said servo motor means, said servo control signal being the spatial rate of change of the spatial rate of change of brightness of said target scene.

17. An improved method for sensing relative angular motion between an object and a target scene and for generating correction signals to maintain the object aligned on the target scene comprising the steps of oscillating a plurality of target area images on a radiation sensitive means for generating electrical signals representative of the oscillated target area images, a plurality of averaging networks, applying said electrical signals sequentially to separate ones of the averaging networks, algebraically summing the outputs of the averaging networks to generate error signals having a magnitude and polarity representative of any relative angular motion between the object and the target scene; and applying said error signals to servo motor means to re-establish the target scene at its initial attitude relative to said radiation sensitive means.

18. An improved method for sensing relative angular displacement between an object and target scene and for generating correction signals to maintain the object aligned on the target scene comprising the steps of oscillating a plurality of overlapping target area images on radiation sensitive means for generating electrical signals in accordance with each of said overlapped images, applying said electrical signals to averaging and summing networks for computing a servo control signal related to the spatial rate of change of the spatial rate of change of brightness of said target scene and a polarity control signal related to the spatial rate of change of brightness of said target scene, said servo control and polarity control signals being indicative of a relative angular displacement between the object and the target scene, and applying said servo control and said polarity control signals to servo motor means to re-establish the target scene at its initial attitude relative to said radiation sensitive means.

References Cited in the file of this patent

UNITED STATES PATENTS

| | | |
|---|---|---|
| 2,517,702 | Offner | Aug. 8, 1950 |
| 2,882,416 | Fairbanks | Apr. 14, 1959 |
| 2,884,540 | Shockley | Apr. 28, 1959 |
| 2,950,474 | Page | Aug. 23, 1960 |